VAN ROY BARNES.
VEHICLE SIGNAL.
APPLICATION FILED JAN. 22, 1920.

1,378,312.

Patented May 17, 1921.
3 SHEETS—SHEET 1.

Van R. Barnes
Inventor

By Lancaster and Allwine
Attorneys

VAN ROY BARNES.
VEHICLE SIGNAL.
APPLICATION FILED JAN. 22, 1920.
1,378,312.
Patented May 17, 1921.
3 SHEETS—SHEET 2.
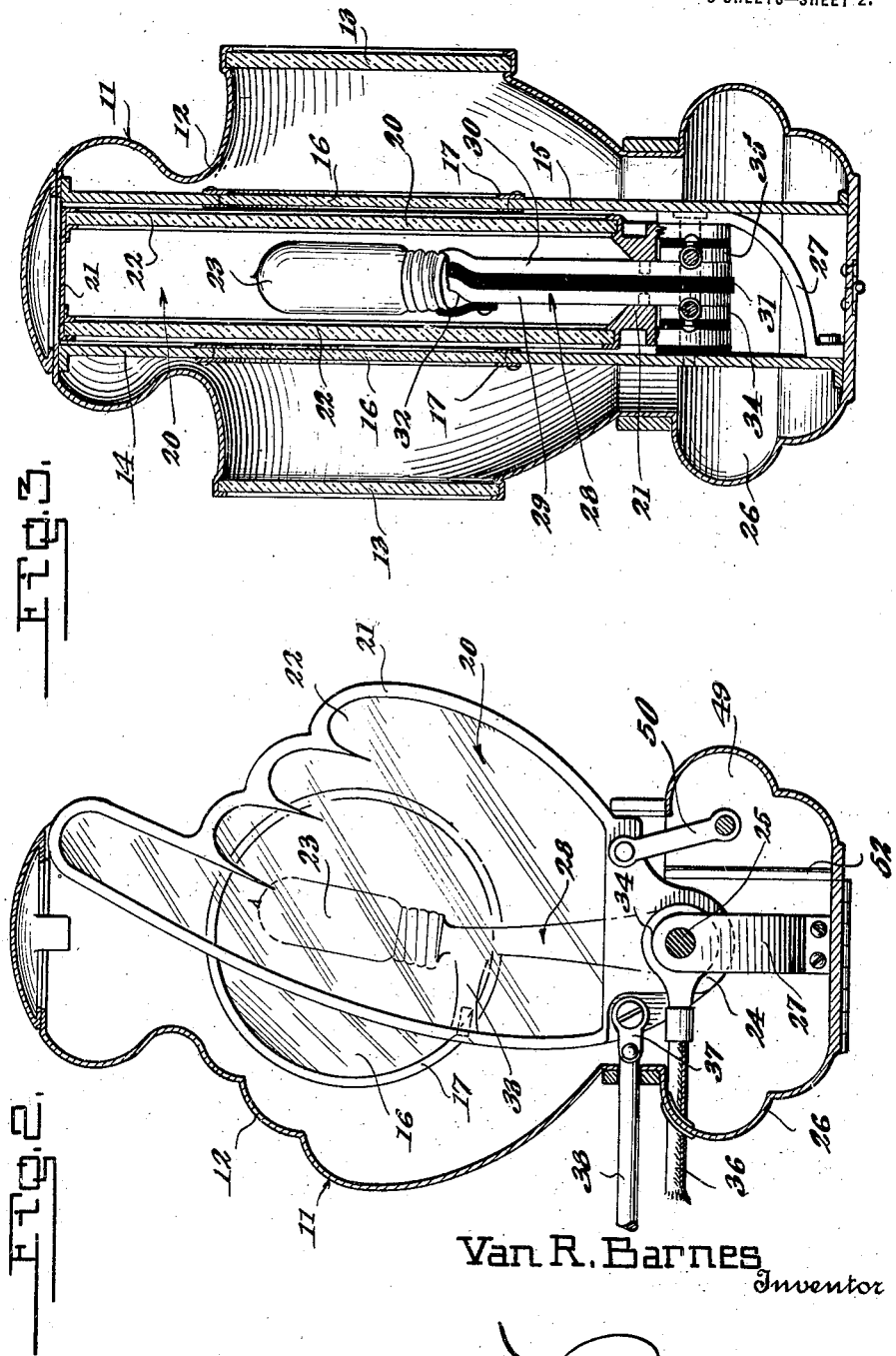

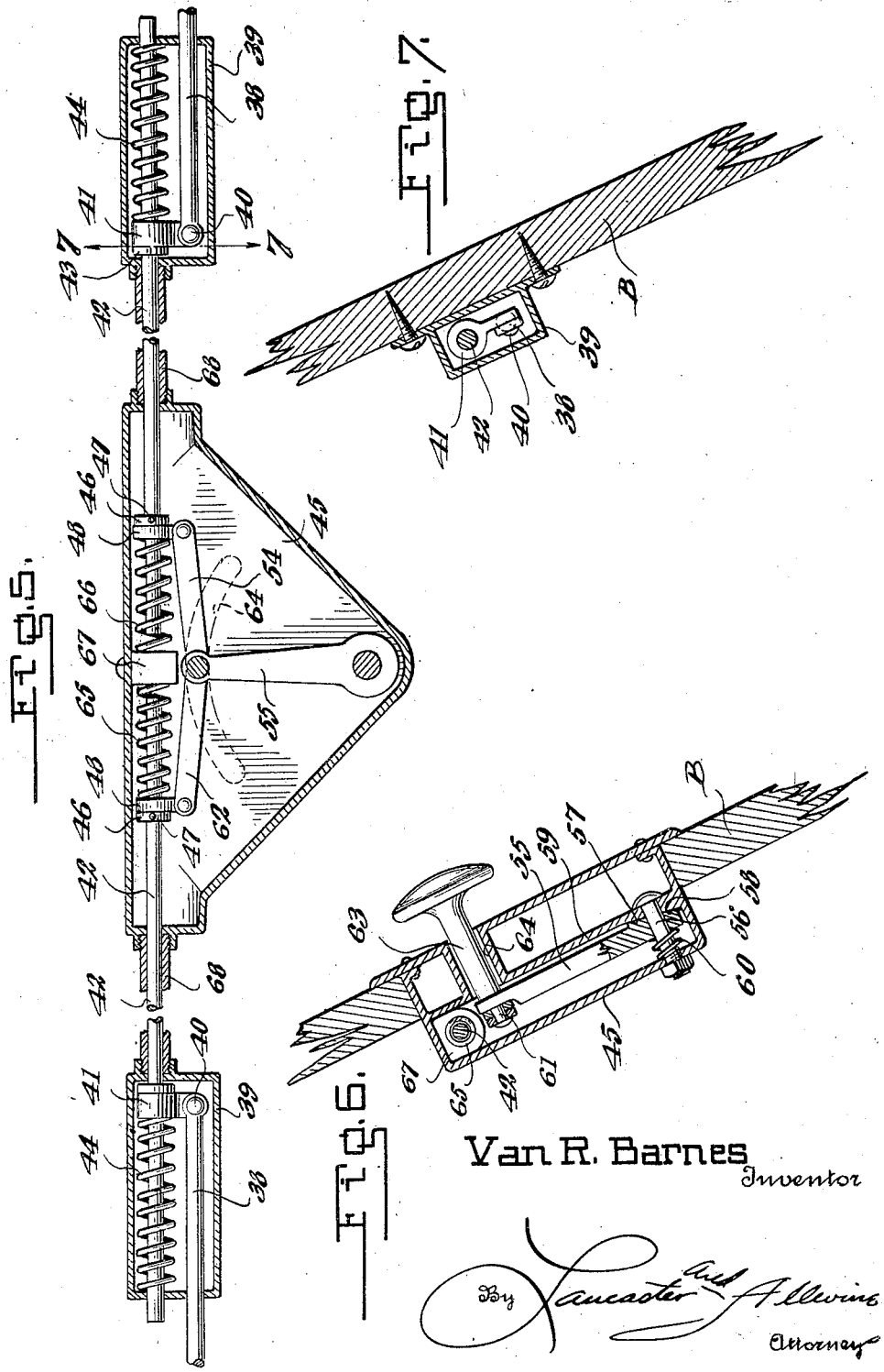

UNITED STATES PATENT OFFICE.

VAN ROY BARNES, OF URBANA, ILLINOIS.

VEHICLE-SIGNAL.

1,378,312.   Specification of Letters Patent.   Patented May 17, 1921.

Application filed January 22, 1920. Serial No. 353,146.

*To all whom it may concern:*

Be it known that I, VAN R. BARNES, a citizen of the United States, residing at Urbana, in the county of Champaign and State of Illinois, have invented certain new and useful Improvements in Vehicle-Signals, of which the following is a specification.

This invention relates to signals particularly designed for use on automobiles, and an object of the invention is to provide a vehicle signal mechanism of neat appearance, which may be attached to any automobile, of approved or existing design or type, without in any way detracting from the attractiveness of the appearance thereof, and one which is particularly designed to be incorporated in the dash lamp construction, of the vehicle.

A further object of this invention is to provide a semaphore or signaling hand, which is designed, so that when in an inoperative or non-signaling position, it will rest within the casing of one of the dash lamps of the vehicle and merge into the design of the casing, so as to be invisible, and which hand carries therein the light or lamp bulb on the dash lamp, so that when the signal is operated, at night, the lamp of the dash lamp structure will be carried outwardly, with the indicating hand, illuminating this hand, so as to attract attention thereto, for the purpose of acquainting the occupants of following vehicles of the direction about to be taken by the vehicle equipped with the improved signal.

A still further object of this invention is to provide means for operating the semaphore or signaling hand of the signal structure, which is simple in construction, and consequently inexpensive to manufacture, and which may be applied to the instrument board of existing types of motor vehicles, without requiring extensive alterations thereto, and which will operate the semaphore or signal hand at either side of the vehicle, independently of operation of the semaphore or signal hand at the opposite side of the vehicle.

Other objects of the invention will appear in the following detailed description, taken in connection with the accompanying drawings, forming a part of this specification, and in which drawings:

Fig. 2 is a vertical section through the signal structure illustrating the semaphore or indicating hand in side elevation.

Fig. 3 is a vertical section through the signal structure taken at right angles to the section illustrated in Fig. 2 and illustrating a section through the semaphore or signal hand.

Fig. 5 is a detail sectional view through the semaphore or signal hand operating means.

Fig. 6 is a detail cross section through a part of the operating means illustrating the manually operated lever for operating the semaphores of the signal mechanism, and Fig. 7 is a detail section through a part of the operating means taken on the line 7—7 of Fig. 5.

Figure 1:
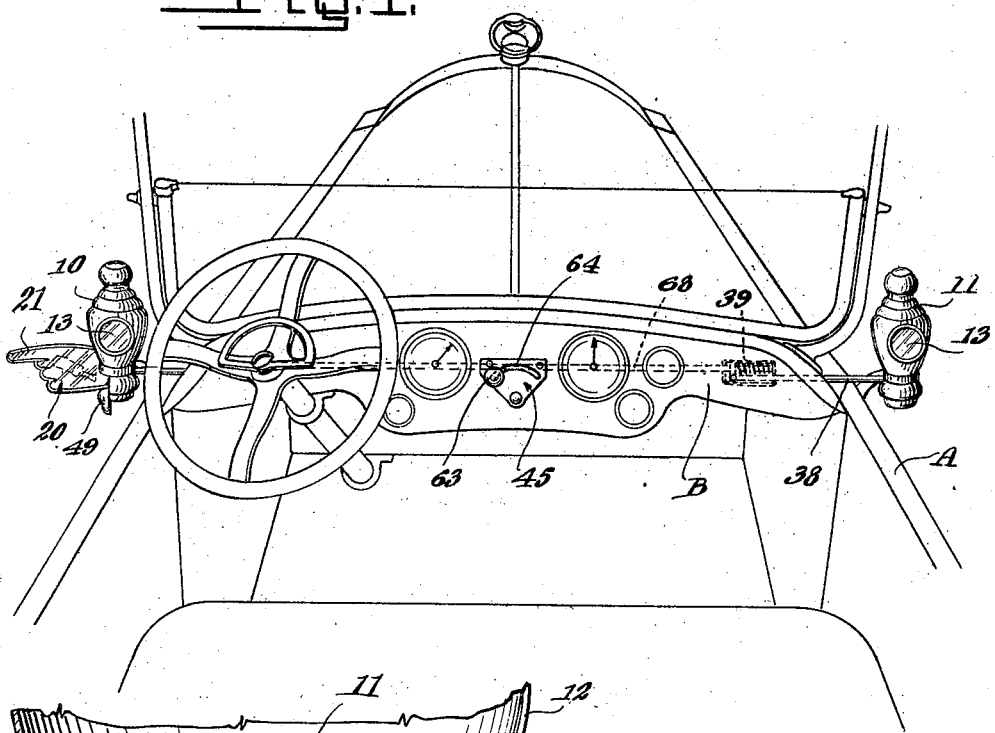
Figure 1 is a fragmentary view looking forward over the engine hood of the motor vehicle, illustrating the improved signal applied thereto.

Referring more particularly to the drawings, wherein like characters indicate like and corresponding parts throughout the several views, 10 and 11 indicate the dash lamp of the motor vehicle A, and these lamps are preferably constructed in any desired design so as to add to the esthetic value of the vehicle A, and so as to incorporate therein the semaphore or signaling hand of each of the signaling mechanisms, so that when these members are in their normally non-exhibiting position, the outer edge portions thereof will merge into the outline of the casing of the dash lamp as clearly shown in Fig. 2 of the drawings.

The dash lamp and consequently the right and left signal mechanism are similar in construction and in the following description, only one of them will be referred to, it being understood that the same types are incorporated in each.

The lamp housing 12 is provided with alining lenses, 13, in its opposite sides as is ordinary in the construction of dash lamps, and it has a pair of vertically extending partitions 14 and 15 therein, in spaced relation to each other, forming a central compartment intermediate the side lenses 13 of the lamp structure. Each of these partitions 14 and 15 is provided with a centrally disposed opening, in which a lens 16 is mounted, the said lens being confined in its opening in the partition by annular confining rings or flanges 17.

Figure 4:
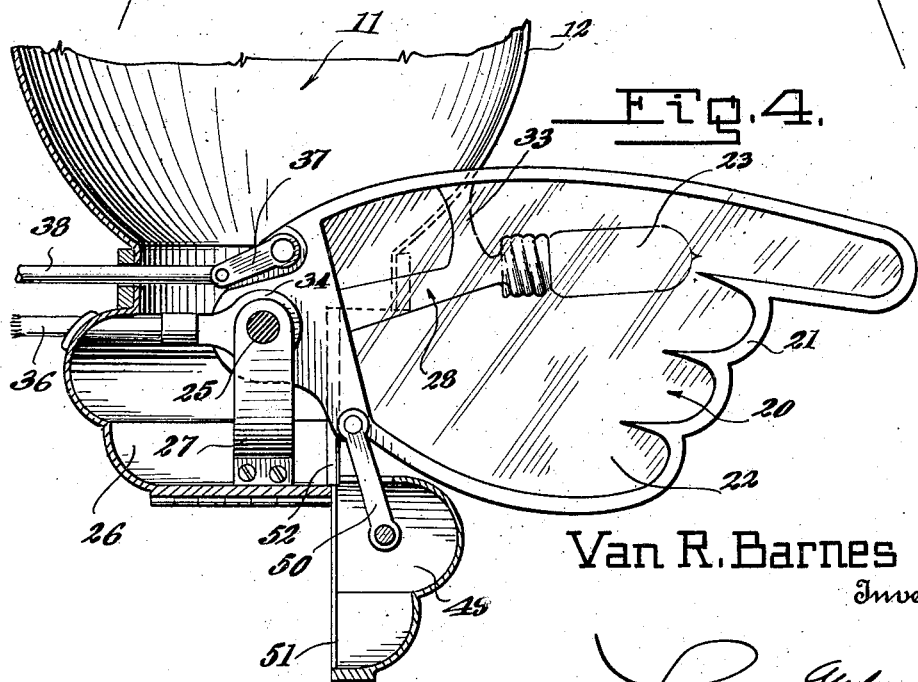
Fig. 4 is a fragmentary section similar to Fig. 2, illustrating the semaphore or signal hand in an extended position.

The semaphore or indicating hand 20 is mounted in the compartment formed by the partitions 14 and 15, and it comprises a frame 21, preferably of metal, or analogous material, the outer edge portion of which is sinuously shaped to conform to the configuration of the shell or casing 12 of the dash lamp, and as will be noted by particular reference to Figs. 1, 2 and 4 of the drawings, this shell simulates the human hand with the index finger extended. The pair of transparent plates 22 are carried by the shell or frame 21, of the semaphore 20 so as to permit the rays of light from the lamp bulb 23 to pass therethrough and consequently through the alining lenses 13 and 16 when the semaphore is in its normal non-signaling position. The lower end of the frame 21, of the semaphore is provided with a depending ear 24, which is pivotally mounted upon a pin 25. This pin 25 is supported within the lower portion 26 of the housing 12 of the dash lamp, by a suitable bracket 27, and by having one end thereof inserted in the partition 14.

The lamp 23 is supported, within the semaphore or indicating hand 20 by a suitable lever structure 28 comprising spaced bars 29 and 30, of suitable electric conducting material, which are held in spaced insulated relation, relative to each other by a strip 31 of insulating material. The strip 29 is positioned for engagement with the central electrode, or contact of the lamp bulb structure, while the conducting strip 30 as adapted for engagement with the outer shell contact or electrode of the lamp bulb, and a bracing member 32 is attached to the strip 29 and engages the outer surface of the sprocket or shell of the lamp bulb, as clearly shown in Fig. 3 of the drawings. This brace 32 is constructed of insulating material. The lever structure 28 is connected to and braced from the shell or frame 21 of the semaphore, by a suitable brace 33.

The ends of the strips 29 and 30 which are mounted about the pin 25, which pin is of suitable insulating material engage contact collars 34, and 35, respectively. These contact collars 34 and 35 have the terminals of electric conducting wires 36 connected thereto, to permit the exciting or energizing of the electrode of the lamp bulb 23. It is to be understood, if so desired, that the pin 25 may be engaged in a suitable sleeve of insulating material, rather than constructing the entire pin of insulation, without departing from the spirit of this invention.

The frame 31 has a bell crank 37 connected thereto at its inner edge, in the rear of and slightly above the pivotal mounting of the frame, and this bell crank is in turn pivotally connected to a rod 38. The rod 38 extends through the side of the vehicle casing, forwardly of the instrument board B of the vehicle A and has its inner end extending into a suitable housing 39, carried by the instrument board. The inner end of the rod 38 is pivotally connected at 40 to the depending ear formed upon the collar 41. The collar 41 is in turn slidably mounted upon a rod 42, which projects into the housing 39 and is slidably supported thereby. The collar 41 is held against movement longitudinally upon the rod 42, in one direction by means of a stop collar 43, and in the other direction its movement longitudinally along the rod is limited by an expansion spiral spring 44. The rod 42 projects into a housing 45 carried by the instrument board B centrally of its end, and this rod has a stop collar 46 mounted thereon and held in adjusted position by means of a set screw 47. A collar 48 is slidably mounted upon the rod 42, and its movement longitudinally of the rod in an outward direction is limited by the stop collar 46, so that when the collar 48 is moved outwardly, and to the right in Fig. 5 of the drawings, the rod 42 will be moved longitudinally to the right and will consequently move the collar 41 and rod 38 for rocking the semaphore 20 upon its pivotal mounting, to move it out of the casing 12, of the lamp structures 10 or 11 into a horizontal exhibiting position as illustrated in Fig. 4 of the drawings. Owing to the construction of the depending portion 26 of the housing 12, of the lamp structure, it will be necessary to displace a portion of its lower part 26, to permit the horizontal lateral extension of the semaphore 20, and this movable portion 49 of the lower portion 26 of the dash lamp is connected to the semaphore 20 by a link 50 which is pivotally connected to the movable section 49 and to the semaphore as clearly shown in Figs. 2 and 4 of the drawings. The movable section 49 is provided with edge flanges 51, which ride in suitable guides 52, and when the rod 42 is moved longitudinally for extending the semaphore 20, the outward and downward pivotal movement of the semaphore, will, through the connection of the link 50 with the section 49 move this section 49 downwardly as clearly shown in Fig. 4 of the drawings. When the semaphore is returned within the housing 12 of the dash lamp structure, the link 50 will return the movable section 49 to its normal position as illustrated at the right of Fig. 1 of the drawings.

The collar 48 has a link 54 connected thereto, which link is in turn connected to the free end of a lever 55. The lever 55 is pivotally mounted upon a pin 56, carried by the housing 45, and it is provided with a beveled bearing surface 57, which is held in engagement with the beveled bearing surface 58 of the partition 59 in the housing 45, by a spring 60. The pin 61 which is employed for connecting the link 54 to the lever 55 also serves to connect the lever or link 62, of the lens structure 10 to the lever 55, and this pin 61 is connected to the operating knob or handle 63. The stem of this operating knob or handle 63 projects through a suitable opening in the housing 45, and is positioned outwardly of the inner surface of the instrument board B. The stem of this knob travels in the arcuate slot 64, formed in the partition 59 and the front side of the housing 45 so as to permit the lever 55 to be swung in either direction for operating the semaphore 20 of either the left or right hand lamp 10 or 11. The mechanism for operating the left hand lamp 10 is, as previously stated, similar to the mechanism heretofore described for operating the semaphore of the right hand lamp 11. When the lever 55 is moved for moving the rod 42 to operate the semaphore 20 of the right hand lamp structure 11, the collar 48 of the semaphore operating mechanism in the lamp 10 slides longitudinally along the rod 42 thereof, against the tension of the expansion spiral spring 65, the normal tendency of which is to hold the collar 48 in engagement with the stop collar 46, and when the lever 55 is moved to operate the semaphore of the lamp 10, the collar 48 of the semaphore operating mechanism of the lamp 11 moves longitudinally on the rod 42 against the tension of a similar spring 66. The inner ends of these springs 65 and 66, engage the suitable block 67 carried by the housing 45.

The rods 42 may be inclosed in suitable protecting housing 68 and it is to be understood that when the signals are used upon the vehicles having arcuate instrument boards B, the flexible rods of the type employed in camera releases may be employed in lieu of rigid rods 42 without departing from the spirit of this invention. It is of course understood that the lamp 23 will be energized or lighted only at night, or when it is desirable to have the dash lamp of the vehicle lighted, and at other times the semaphores will be clearly visible when extended into signaling position. The operating of these semaphores is to be carried out in the usual signaling manner, that is, when the vehicle is about to turn to the right, the operator will operate the signal to extend the semaphore 20 at the right hand side of the vehicle, and when he is about to turn to the left, he will operate the semaphore at the left hand side of the vehicle.

From the foregoing description taken in connection with the drawings, it is apparent that a vehicle signal has been provided which is comparatively simple in construction and will not detract in any way from the attractiveness of the appearance of the vehicle upon which it is applied, and it is further to be understood that changes in details may be made without departing from the spirit of this invention; but;

I claim:

1. In a vehicle signal, the combination with a vehicle dash lamp including a casing, of a signaling semaphore pivotally carried thereby and housed within the lamp casing when in a non-signaling position, the normal outer edge of said semaphore shaped to merge into the outline of the lamp casing and form a part thereof when the semaphore is in a non-signaling position, means connected to the semaphore for moving it into a horizontal signaling position, a portion of the lower part of the lamp casing being movable relative to the casing, and means connecting said movable portion and said semaphore whereby the movable portion will be moved synchronously with movement of the semaphore.

2. In a vehicle signal, the combination with a vehicle dash lamp including a casing, of a signaling semaphore pivotally carried thereby and housed within the lamp casing when in a non-signaling position, the normal outer edge of said semaphore shaped to merge into the outline of the lamp casing and form a part thereof when the semaphore is in a non-signaling position, means connected to the semaphore for moving it into a horizontal signaling position, a portion of the lower part of the lamp casing being movable relative to the casing, means connecting said movable portion and said semaphore whereby the movable portion will be moved synchronously with movement of the semaphore, and a lamp carried by the semaphore and serving as the lamp of the dash lamp structure.

3. In a vehicle signal, the combination with a vehicle dash lamp including a casing, of a pair of partitions within said casing and in spaced relation, alining lenses in said partitions, a signaling semaphore pivotally carried by the lamp casing and housed between said partitions when in a non-signaling position.

4. In a vehicle signal, the combination with a vehicle dash lamp including a casing, of a pair of partitions within said casing and in spaced relation, alining lenses in said partitions, a signaling semaphore pivotally carried by the lamp casing and housed between said partitions when in a non-signaling position, said semaphore comprising a frame and transparent sides, and a lamp carried by the semaphore and serving as the lamp of a dash lamp structure.

5. In a vehicle signal, the combination with a vehicle dash light including a casing, having lenses therein, of a pair of spaced partitions within the lamp casing and carrying lenses alining with each other and with the lenses of the light casing, a signaling semaphore pivotally carried by the lamp casing and housed therein between said partitions, when in a non-signaling position, a lamp carried by the semaphore and serving as the lamp of the dash light structure, the outer end of said semaphore shaped to merge into the outline of the lamp casing and form a part thereof when the semaphore is in a non-signaling position.

6. In a vehicle signal, the combination with a vehicle dash light including a casing, having lenses therein, of a pair of spaced partitions within the lamp casing and carrying lenses alining with each other and with the lenses of the light casing, a signaling semaphore pivotally carried by the lamp casing and housed therein between said partitions, when in a non-signaling position, a lamp carried by the semaphore and serving as a lamp of the dash light structure, the outer end of said semaphore shaped to merge into the outline of the lamp casing and form a part thereof when the semaphore is in a non-signaling position, means connected to the semaphore for moving it into a horizontal signaling position.

7. In a vehicle signal, the combination with a vehicle dash light including a casing, having lenses therein, of a pair of spaced partitions within the lamp casing and carrying lenses alining with each other and with the lenses of the light casing, a signaling semaphore pivotally carried by the lamp casing and housed therein between said partitions, when in a non-signaling position, a lamp carried by the semaphore and serving as a lamp of the dash light structure, the outer end of said semaphore shaped to merge into the outline of the lamp casing and form a part thereof when the semaphore is in a non-signaling position, means connected to the semaphore for moving it into a horizontal signaling position, a portion of the lower part of the lamp casing being movable relative to the casing, and means connecting said movable portion and said semaphore whereby the movable portion will be moved synchronously with the semaphore.

VAN ROY BARNES.

Attest—
W. E. ATKINSON.